United States Patent [19]

Mo

[11] Patent Number: 4,636,894
[45] Date of Patent: Jan. 13, 1987

[54] RECORDING HEAD SLIDER ASSEMBLY

[75] Inventor: Frank S. C. Mo, Cupertino, Calif.

[73] Assignee: Censtor Corp., San Jose, Calif.

[21] Appl. No.: 588,235

[22] Filed: Mar. 12, 1984

[51] Int. Cl.⁴ .......................................... G11B 17/32
[52] U.S. Cl. ..................................... 360/103; 360/102
[58] Field of Search ..................... 360/103, 102, 97–99

[56] References Cited

U.S. PATENT DOCUMENTS

| 3,678,482 | 7/1972 | Billawala | 360/103 |
| 3,823,416 | 7/1974 | Warner | 360/103 |
| 3,855,625 | 12/1974 | Garnier et al. | 360/103 |
| 4,212,044 | 7/1980 | Plotto | 360/103 |
| 4,218,715 | 8/1980 | Garnier | 360/103 |
| 4,553,184 | 11/1985 | Ogishima | 360/103 |

FOREIGN PATENT DOCUMENTS

| 55-052544 | 4/1980 | Japan | 360/103 |
| 57-200967 | 12/1982 | Japan | 360/103 |

Primary Examiner—John H. Wolff
Assistant Examiner—Matthew J. Bussan
Attorney, Agent, or Firm—Gerald L. Moore

[57] ABSTRACT

A slider for flying along a recording surface and carrying a recording head (19,20) for recording data, comprising an air bearing region (12,14) to create a positive pressure region tending to support the slider, and a negative pressure region (21) tending to hold the slider close to the recording surface, with buffer pads (27,28) and grooves (25,26) between the positive and negative pressure regions to create a neutral pressure zone separation.

6 Claims, 5 Drawing Figures

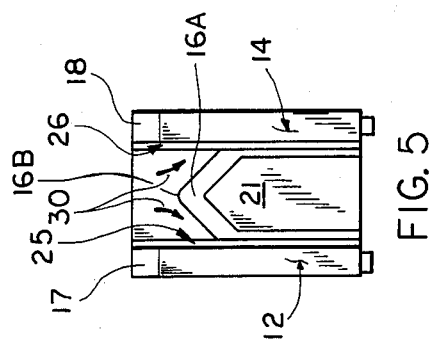
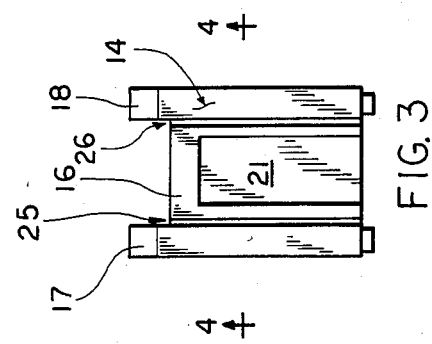
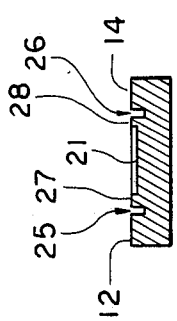
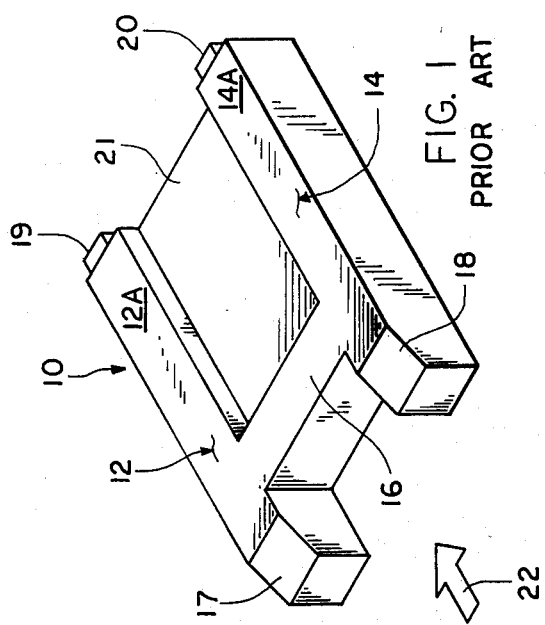
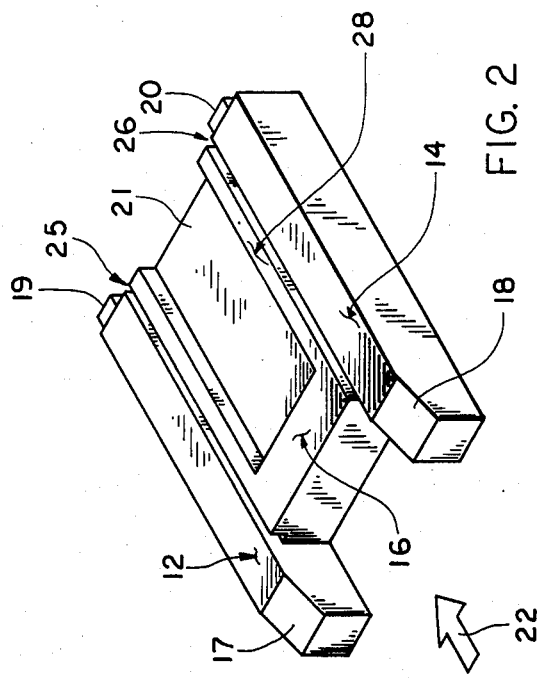

RECORDING HEAD SLIDER ASSEMBLY

FIELD OF THE INVENTION

This invention relates to a design for and a method of making a magnetic head slider assembly of the type that rides on an air bearing.

BACKGROUND OF THE INVENTION

Since the first movable head disc file was manufactured in quantity in the late 1950s, air lubricated slider bearings have been used to house and position the magnetic transducer over a spinning disc for data recording. The film of air that moves with the spinning disc serves to support the head at a predetermined fixed distance above the disc surface. A desired characteristic of a slider bearing used to support such a head is that only small variations in flying height result as the slider is accessed to different radial locations over the disc surface. As the flying height varies, different magnitudes of write current may become necessary to obtain an essentially constant signal amplitude in the recorded data. If the head to disc spacing is maintained nearly constant, compensation of the write current is not necessary. However, the relative speed between the head and the recording surface varies as the head is moved radially across the disc surface, since for any selected revolutions per minute, those surface portions located at greater radii from the center are moving much faster than those nearer the center. Thus, the film of air on which the head rides also varies in speed and possibly in thickness.

In recent years the trend has been towards reducing the flying height of the head. Such is necessary to increase the recording density of the data. Naturally, the reduction in spacing between the head and recording surface increases the chances for head crashes thereby requiring more precision in the control of the flying height of the head. To compensate for the lower flying height, therefore, stiffer air bearings have been designed to provide improved stability. Concurrent with this trend has been the use of smaller low mass sliders that start and stop in contact with the disc surface. This requires that only a small load force be applied to the slider in order to minimize wear to the magnetic surface of the disc.

One of the more current slider bearing design concepts involves two rails separated by a relieved section capable of dynamically generating a partial vacuum, thereby eliminating or reducing the need of an external loading force. An example of such an assembly is shown in U.S. Pat. No. 3,855,625 entitled Magnetic Head Slider Assembly issued on Dec. 17, 1974 with Garnier et al as inventors. Such a slider bearing is composed of two rails separated by a relieved section with each rail having a taper flat configuration. The taper flat serves to pressurize the lubricant i.e. air, and the slider is supported by the distributed load carried by the thin air film. The relieved section produces a vacuum suction force which counter-balances the load caused by the taper flat configuration of the two rails. The slider is mounted on a gimbaled flexure suspension, which provides multiple degrees of freedom for excursion of the assembly. Typically, the magnetic transducer is mounted at the trailing edge of one slider rail.

The type of slider disclosed in this patent is generally known as a "zero load" slider. The "zero load" slider exhibits the characteristics of both a low static load and a high air bearing stiffness rendering distinct advantages in maintaining a constant spacing with the disc surface while presenting low contact forces when resting on the disc surface. However, the "zero load" slider by virtue of its relieved section for producing vacuum suction forces, does require extra fabrication processes such as etching and the materials necessary for manufacture of the slider assembly have made control of these processes difficult. Thus, because of rejection rates and other reasons, such a slider assembly has been made more expensive.

It is the purpose of the present invention to provide an improved design and method for manufacturing a "zero load" slider of the type discussed above.

SUMMARY OF THE INVENTION

A device and the method of manufacture therefore, comprising a slider having a surface for flying along a recording surface on which data is recorded. The slider includes an air bearing region extending generally parallel to the recording surface to create a positive pressure region tending to support the slider and a negative pressure region for creating a negative pressure tending to hold said slider close to the recording surface. Positioned between the air bearing region and the negative pressure region is a narrow buffer pad of air bearing surface. One edge of this pad borders on the negative pressure region. The other edge of the pad is separated from the main air bearing surface by a groove or channel of reasonable depth.

DESCRIPTION OF THE DRAWINGS

FIG. 1 shows a prior art slider for supporting a transducer above a recording medium surface.

FIG. 2 is a perspective view of a slider incorporating the present invention.

FIG. 3 is a bottom view in smaller detail of the slider shown in FIG. 2.

FIG. 4 is a cross sectional view along the line 4—4 of FIG. 3.

FIG. 5 is a second embodiment of the present invention.

DESCRIPTION OF THE INVENTION

In FIG. 1 is shown a prior art slider assembly 10 comprising two side rails 12 and 14 and a cross rail 16 joining the two spaced paralled side rails.

As the slider assembly is positioned with the rail surfaces 12A and 14A adjacent a recording surface (not shown), a positive pressure region is created between these rail surfaces and the recording surface. The fluid or air being pulled along with the recording medium surface, which ordinarily is a rotating disc, is compressed by the forward taper surfaces 17 and 18 and serves as a lubricant and cushion on which the slider assembly is supported. Fixed to the trailing edges of the rails are transducers 19 and 20, which extend flush with the rail surfaces 12A and 14A respectively. These transducers serve to interact with the magnetic coating on the recording medium to record and read back information on the medium.

For causing close tracking of the slider assembly along the recording surface, there is formed the recessed area 21 bordered by the side rails 12 and 14 and the cross rail 16, which area creates a sub-ambient pressure region. This negative pressure region causes a suction force between the slider assembly and the recording medium surface serving to attract the slider to the surface. Thus, the air bearing or higher pressure region adjacent the surfaces 12A and 14A of the side rails serves to support the slider assembly while the lower pressure region attracts it towards the medium surface. The height that the slider assembly rides above the medium surface is that height at which these forces are equalized.

Since the rails present air bearing surfaces which can be closely controlled in area, the positive pressure region is controlled thereby closely regulating the magnitude of the supporting force. The suction force between the slider assembly and the recording surface depends upon the volume of expansion of the air passing beneath the cross bar 16 and into the low pressure region. Naturally, a change in the volume of the low pressure region 21, results in a change in the negative pressures and the suction force between the slider assembly and the recording surface.

Normally, the recessed zone has a depth on the order of ten microns. Such a zone is difficult to fabricate with accuracy. One preferred method of fabrication has involved etching the material away in the recessed zone, but the etching process is somewhat difficult to control and the problem is compounded in prior art sliders because underetching has frequently resulted in increasing the size of the air bearing surface, thereby compounding the overall effect on the slider operation. In the same manner, overetching of the low pressure zone has reduced the air bearing surface to compound the problem. Furthermore, some materials are more difficult to etch than others and frequently those that can be etched accurately to meet the tolerances necessary fail to meet other requirements for the slider, such as providing the wear quality required.

In accordance with the present invention, there is formed at the adjacent sides of the pads 12 and 14 relatively deep grooves 25 and 26 respectively by such conventional means as grinding. Narrow air bearing buffer pads 27 and 28 are thereby formed between the grooves and the recessed zone 21 such that the recessed zone is no longer bounded by the side rails 12 and 14. By incorporating this structure, the air bearing surfaces 12A and 14A are closely controlled in size since the boundaries thereof are determined by conventional machining methods. Formation of the recessed area 21 no longer affects the area of the side rails. While it is true that the width of the buffer pads 27 and 28 may vary, it has been found that these pads are sufficiently narrow to present little or no air bearing effect because the fluid spills to either side of the pads and does not form a significant positive pressure region on the pad surface. Such spilling is encouraged by the low pressure region adjacent the surface 21 and the ambient pressure region within the channels 25 and 26. Thus, there is provided a slider having precision measurements to allow close controlling of the operating parameters.

In FIG. 5 is shown yet another design of the subject invention, wherein each of the components remain substantially the same, with the exception of the cross rail 16A. Cross rail 16A is V shaped preferably to be made by etching with the apex 16B pointing in the same direction as the taper pads 17 and 18 so as to cause an air flow in the direction of the arrows 30, extending along the face of the cross rail and then through the channels 25 and 26. Of course some air will flow beneath the cross rail as in the previous embodiment. In this manner, most dirt particles, etc., can be caused to flow down the channels and past the slider rather than becoming lodged on the cross rail face.

The invention claimed:

1. A device for supporting a transducer over a recording medium surface on an air bearing generated by an air flow caused by the motion of the medium surface past the transducer, said device comprising:
   a slider having a surface including an air bearing region extending generally parallel to said medium surface to create a positive pressure region therebetween tending to support said slider over said medium surface,
   said slider also including in said surface a recessed zone for creating a negative pressure region between the slider and medium surface tending to pull said slider towards said medium surface,
   said slider also having formed therein a buffer pad and groove combination extending between and separating said positive and negative pressure regions for containing the negative pressure and for creating an ambient pressure region within said groove, and
   said buffer pad is sufficiently narrow as to preclude a significant positive pressure region between said buffer pad and said recording medium surface, in contrast to said positive pressure region created by said air bearing region, so that said buffer pad produces little or no air bearing effect.

2. A device as defined in claim 1 wherein said slider buffer pad and groove combination extends generally parallel to the direction of air flow past said slider.

3. A device as defined in claim 2 wherein said air bearing region includes a surface positioned upstream relative to said air flow from said parallel surface that extends non parallel to said medium surface.

4. A device as defined in claim 3 wherein said negative pressure region includes a concave section formed in said slider surface.

5. A device as defined in claim 2 wherein said parallel surface forming said air bearing region extends on at least two sides of said negative pressure generating region.

6. A device as defined in claim 5 wherein said surface includes a plurality of buffer pads and grooves.

* * * * *